(12) United States Patent
Ruiz et al.

(10) Patent No.: US 10,000,020 B2
(45) Date of Patent: Jun. 19, 2018

(54) METHOD AND DEVICE FOR PRODUCING AREAS IN A PRINTED OBJECT HAVING DIFFERENT COEFFICIENTS OF FRICTION

(71) Applicant: Xerox Corporation, Norwalk, CT (US)

(72) Inventors: Erwin Ruiz, Rochester, NY (US); Steven M. Russel, Bloomfield, NY (US); Paul M. Fromm, Rochester, NY (US); Jeffrey N. Swing, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 61 days.

(21) Appl. No.: 14/880,683

(22) Filed: Oct. 12, 2015

(65) Prior Publication Data
US 2017/0100889 A1    Apr. 13, 2017

(51) Int. Cl.
*B29C 64/124* (2017.01)
*B29C 67/00* (2017.01)
*B33Y 10/00* (2015.01)
*B33Y 30/00* (2015.01)
*B29C 64/112* (2017.01)
(Continued)

(52) U.S. Cl.
CPC ........ *B29C 67/0059* (2013.01); *B29C 64/112* (2017.08); *B29C 64/124* (2017.08); *B29C 64/386* (2017.08); *B29C 67/0088* (2013.01); *B33Y 10/00* (2014.12); *B33Y 30/00* (2014.12); *B33Y 50/02* (2014.12)

(58) Field of Classification Search
CPC . B33Y 70/00; B29C 67/0055; B29C 67/0066; B29C 2035/0827; B29C 66/73751; B29C 64/124; B29C 64/112
See application file for complete search history.

(56) References Cited

U.S. PATENT DOCUMENTS 5,238,614 A * 8/1993 Uchinono ........... B29C 67/0066
                                                                  118/423
5,594,652 A * 1/1997 Penn ................... B29C 67/0059
                                                                  345/419
(Continued)

OTHER PUBLICATIONS

Tiodize Co., Inc.; Hardtuf by Tiodize—Aluminum Anodizing; Jul. 6, 2015; 3 Pages; Tiodize Co., Inc.; www.tiodize.com/aluminium_anodizing.html.
(Continued)

*Primary Examiner* — Alison L Hindenlang
*Assistant Examiner* — Michael Robinson
(74) *Attorney, Agent, or Firm* — Maginot Moore & Beck LLP

(57) ABSTRACT

A three-dimensional object printer enables forming portions of an object with a material having a higher melting temperature and a lower coefficient of friction. The printer includes a member, a printhead, and an applicator. A controller operates the printhead to eject a first material having a first coefficient of friction toward the member and operates the applicator to eject a second material having a second coefficient of friction toward the member. The second material has a higher melting temperature and a lower coefficient of friction than the first material. The printer further includes a curing device. The controller operates the curing device to direct radiation toward the member to cure the first material. The second material is cured into the first material.

7 Claims, 12 Drawing Sheets

(51) Int. Cl.
    *B33Y 50/02* (2015.01)
    *B29C 64/386* (2017.01)

(56) References Cited

U.S. PATENT DOCUMENTS

| | | | | |
|---|---|---|---|---|
| 6,355,601 | B1* | 3/2002 | Takenaka | F16D 69/02 106/36 |
| 6,966,960 | B2 | 11/2005 | Boyd et al. | |
| 7,067,462 | B2 | 6/2006 | Krohn | |
| 8,801,418 | B2 | 8/2014 | El-Siblani et al. | |
| 2004/0187714 | A1* | 9/2004 | Napadensky | B29C 41/48 101/35 |
| 2005/0110853 | A1* | 5/2005 | Gardner | B05D 5/00 347/102 |
| 2012/0195994 | A1* | 8/2012 | Ei-Siblani | B29C 67/007 425/174.4 |
| 2015/0210009 | A1* | 7/2015 | Johnson | B05B 17/04 264/308 |
| 2017/0023061 | A1* | 1/2017 | Sanz | F16C 33/3831 |

OTHER PUBLICATIONS

Intech Services; Application Overview for DuPont Teflon Industrial Coatings; Jul. 6, 2015; 4 Pages; www.intechservices.com/DuPont-Teflon-Coatings/Application-Overview.

Toefco Engineered Coating Systems, Inc.; Teflon coating Spray; May 28, 2014; 2 Pages; http://toefco.com/teflon-coating-spray/.

The Chemours Company; Teflon Coatings for Industrial Applications; 2015; 2 Pages; www.chemours.com/Teflon_Industrial/en_US/products/product_by_type/coatings/index.html.

Ginger Gardiner; CompositesWorld; May 1, 2015; 6 Pages; Gardner Business Media, Inc.

Intech Services, Inc.; DuPont Teflon Coating Products Overview; 2013; 3 Pages; www.intechservices.com/DuPont-Teflon-Coatings/Product-Overview.

* cited by examiner

METHOD AND DEVICE FOR PRODUCING AREAS IN A PRINTED OBJECT HAVING DIFFERENT COEFFICIENTS OF FRICTION

TECHNICAL FIELD

The device disclosed in this document relates to printers that produce three-dimensional objects and, more particularly, to the production of objects with areas having different coefficients of friction.

BACKGROUND

Digital three-dimensional manufacturing, also known as digital additive manufacturing, is a process of making a three-dimensional solid object of virtually any shape from a digital data model. Polyjet three-dimensional printing is an additive process in which one or more printheads or ejector heads eject successive layers of material on a substrate in different shapes. The substrate is supported either on a platform that can be moved three dimensionally by operation of actuators operatively connected to the platform, or the printhead or printheads are operatively connected to one or more actuators for controlled movement of the printhead or printheads to produce the layers that form the object. Three-dimensional printing is distinguishable from traditional object-forming techniques, which mostly rely on the removal of material from a work piece by a subtractive process, such as cutting or drilling.

Three-dimensional objects produced with these printers can be made of a variety of materials that can be ejected from ejectors of the printhead or printheads onto the substrate. Thus, one issue that arises in the production of three-dimensional objects with a three-dimensional printer is that the material of which the three-dimensional object can be made is limited to that which can be ejected through the ejectors onto the substrate. To be ejected through ejectors, a material must be able to be heated to a non-solid state having a viscosity suitable for ejection as discrete droplets onto the substrate. The precise viscosity and temperature of the material varies depending on the type of ejectors and the geometry of the printheads. However, in general, materials having a high melting temperature or a low freezing temperature are typically unsuitable for production of three-dimensional objects due to the difficulty of maintaining a suitable temperature and viscosity of the material during operation of the three-dimensional printer.

One example of a material having a high melting temperature is polytetrafluoroethylene (PTFE). When it hardens, PTFE provides a smooth surface having a low coefficient of friction. Accordingly, producing three-dimensional objects with smooth areas arising from the presence of PTFE would be advantageous. A three-dimensional object printer capable of producing objects made from materials having a high melting temperature, such as PTFE, or a low freezing temperature would be advantageous because a three-dimensional object printer capable of forming objects with regions having different coefficients of friction would be beneficial.

SUMMARY

A three-dimensional object printer that can produce a three-dimensional object with regions having different coefficients of friction has been developed. The three-dimensional object printer includes a member, a plurality of ejectors fluidly connected to a supply of a first material, an applicator fluidly connected to a supply of lubricant, a curing device configured to direct radiation towards the member, an actuator operatively connected to the applicator, and a controller operatively connected to the applicator, the curing device, and to the ejectors in the plurality of ejectors to enable independent operation of the ejectors. The controller is configured to operate the plurality of ejectors selectively to form a layer of an object on the member. The controller is further configured to operate the curing device to cure at least a portion of the layer of the object to produce a cured first region and an uncured second region. The controller is also configured to operate the actuator to move the applicator opposite the member and to operate the applicator to eject lubricant toward the member to enable the first region to have a first coefficient of friction and the second region to have a second coefficient of friction.

A method forming an object with regions having different coefficients of friction comprising has been developed. The method includes operating selectively with a controller a plurality of ejectors that are operatively connected to a supply of first material to form a layer of an object on a member. The method further includes operating with the controller a curing device to cure at least a portion of the layer of the object to produce a cured first region and an uncured second region of the object. The method further includes operating with the controller an actuator to move an applicator that is fluidly connected to a supply of lubricant to a position opposite the member. The method further includes operating the applicator with the controller to eject lubricant toward the member to enable the first region to have a first coefficient of friction and the second region to have a second coefficient of friction.

BRIEF DESCRIPTION OF THE DRAWINGS

The foregoing aspects and other features of an apparatus and method that can produce a three-dimensional object with regions having different coefficients of friction are explained in the following description, taken in connection with the accompanying drawings.

DETAILED DESCRIPTION

Figure 1:
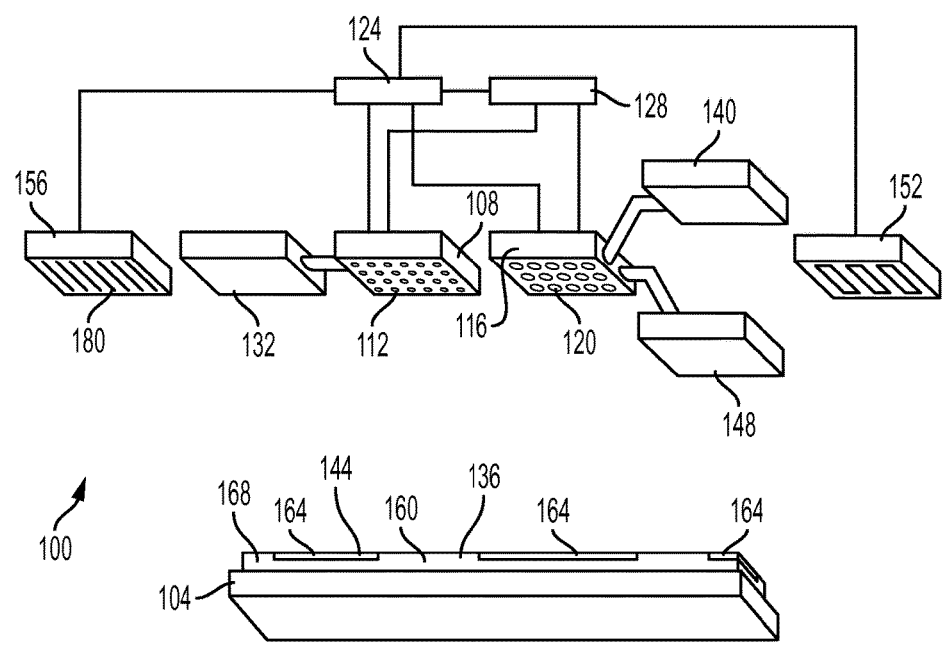
FIG. 1 shows a printing system configured to form an object with regions having different coefficients of friction.

For a general understanding of the environment for the device and method disclosed herein as well as the details for the apparatus and method, reference is made to the drawings. In the drawings, like reference numerals designate like elements.

As used herein, the term "lubricant" is used to refer to a substance that is applied or added to a material surface to reduce the coefficient of friction of the material surface. Accordingly, a lubricant reduces friction between the material surface and another surface in mutual contact with the material surface. As a result, a lubricant reduces heat generated when the material surface moves relative to the contacted surface. One example of a lubricant, as used herein, is PTFE.

A three-dimensional object printing system 100 is shown in FIG. 1. The printing system 100 includes a substrate or a member 104, a printhead 108 including a plurality of ejectors 112, and an applicator 116 including a plurality of applicator ejectors 120. The printing system 100 further includes a controller 124 and one or more actuators 128, each of which is operatively connected to both the printhead 108 and the applicator 116. The controller 124 is configured to selectively operate the printhead 108 and the applicator 116 to eject material toward the member 104, and the actuator 128 is configured to selectively position the printhead 108 and the applicator 116 relative to the member 104. Additionally, the controller 124 and the actuator 128 are electrically coupled to one another to enable the controller 124 to selectively coordinate operation of the actuator 128 to move the printhead 128 and the applicator 116 with ejection of material toward the member 104. In at least one embodiment, the actuator 128 is configured to selectively move the printhead 108 and applicator 116 vertically toward and away from the member 104. In at least one embodiment, the actuator 128 is configured to move the printhead 108 and applicator 116 laterally in a plane parallel with a top surface of the member 104.

The printing system 100 also includes a first material supply 132, configured to retain a first material 136 and supply the first material 136 to the printhead 108, a second material supply 140, configured to retain a second material 144 and supply the second material 144 to the applicator 116, and an air supply 148, configured to generate an air flow, which is supplied to the applicator 116. The controller 124 selectively operates the printhead 108 to eject the first material 136 from the plurality of ejectors 112 toward the member 104 to form a region 160 of the first material 136 on the member 104. The first material 136 is, for example, a typical build material used in three-dimensional printers to form three-dimensional objects. In at least one embodiment, the first material 136 is acrylic based. Similarly, the controller 124 operates the applicator 116 to selectively eject the second material 144 and air from the plurality of applicator ejectors 120 toward the member 104 to form a region 164 of the second material 144 on the member 104. The second material 144 is, for example, a polymer that has a low friction coefficient when solid. In at least one embodiment, the second material 144 is PTFE. The controller 124 operates the applicator 116 to eject both the second material 144 and air together as an aerosol. In at least one embodiment, the controller 124 is also electrically coupled to the first material supply 132, the second material supply 140, and the air supply 148 to selectively force the first material 136 into the printhead 108 and to selectively force the second material 144 and air into the applicator 128. In at least one embodiment, the second material 144 and the air are mixed together in the applicator 116 prior to being ejected toward the member 104.

The controller 124 is further configured to digitally address each ejector of the plurality of ejectors 112 and of the plurality of applicator ejectors 120 to precisely control the ejection of the first material 136 and the second material 144 toward the member 104. Accordingly, by moving the printhead 108 and applicator 116 to particular locations relative to the member 104 via the actuator 128, and by digitally addressing the ejectors to eject the first material 136 and the second material 144 via the controller 124, the printing system 100 is configured to form a three-dimensional object 168 having precisely dimensioned regions 160 of the first material 136 and regions 164 including the second material 144 on the member 104.

The precision of the dimensions of the regions 160, 164 able to be formed by the printing system 100 depends, in part, on the size and arrangement of the plurality of ejectors 112 on the printhead 108 and the plurality of applicator ejectors 120 on the applicator 116, and on which materials are used as the first material 136 and the second material 144. For example, larger ejectors or ejectors that are spaced farther apart from one another are not able to produce an object with the same precision as smaller ejectors or ejectors that are spaced closer to one another. Additionally, a material having a lower viscosity may run when ejected and change its shape or position on the member 104. Similarly, a material having a higher viscosity can clog the ejectors or clump together on the member 104.

The printing system 100 also includes a curing device 152 and a planerizer or leveler 156, both of which are electrically coupled to the controller 124 to be selectively operated by the controller 124. The curing device 152 is configured to direct radiation toward the first material 136 on the member 104 to cure the first material 136. In at least one embodiment, the curing device 152 directs ultraviolet radiation to cure the first material 136. However, in other embodiments, other types of radiation can be emitted from the curing device 152 to cure the first material 136.

Figure 3A:
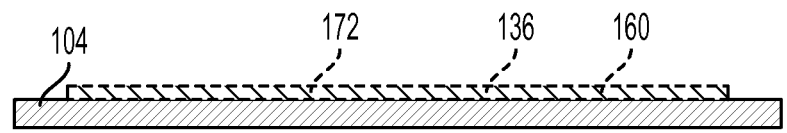
FIG. 3A shows a side cross-sectional view of the object of FIG. 1 after a first portion of the method of FIG. 2 has been completed.
Figure 3B:
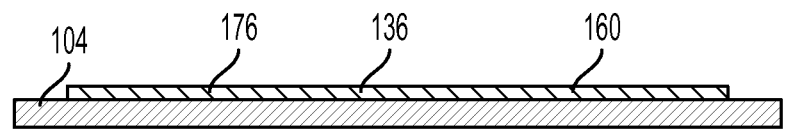
FIG. 3B shows a side cross-sectional view of the object of FIG. 1 after a second portion of the method of FIG. 2 has been completed.
Figure 3C:
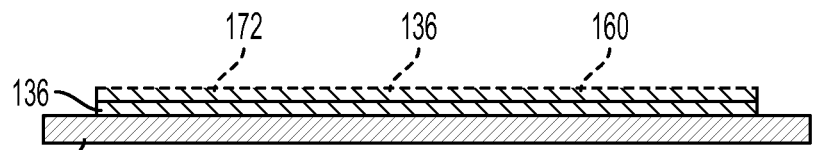
FIG. 3C shows a side cross-sectional view of the object of FIG. 1 after a third portion of the method of FIG. 2 has been completed.

The controller 124 is configured to selectively operate the printhead 108, the applicator 116, and the curing device 152 successively, first to eject material onto the member 104 to form an outermost uncured layer 172 (FIG. 3A), and then to cure the outermost uncured layer 172 into an outermost cured layer 176, which is shown, for example, in FIG. 3B. Additionally, the controller 124 can then operate the printhead 108 and the applicator 116 again to eject more material onto the member 104 on top of the outermost cured layer 176 to form a new outermost uncured layer 172 as shown in FIG. 3C. In at least one embodiment, the curing device 152 is also coupled to an actuator to move the curing device 152 relative to the member 104. The actuator can be the same actuator 128 electrically coupled to the printhead 108 and the applicator 116 or a separate actuator.

When material is ejected onto the member 104, slight deviations in the thickness of the material may result from jetting variations. Accordingly, to ensure accuracy of the height of the object 168, the leveler 156 is configured to remove material from the outermost uncured layer 172 to smooth and level out the outermost layer of the object 168 between applications of new outermost uncured layers 172. In at least one embodiment, the leveler 156 includes at least one roll 180 configured to contact and apply pressure to the outermost uncured layer 172 of the object 168 to remove a topmost portion of the outermost uncured layer 172. The controller 124 is configured to selectively operate the leveler 156 and the curing device 152 successively to smooth and level the outermost uncured layer 172 and then to cure the outermost uncured layer 172 into the outermost cured layer 176. In at least one embodiment, the leveler 156 is also electrically coupled to an actuator to move the leveler 156 relative to the member 104. The actuator can be the same actuator 128 electrically coupled to the printhead 108 or a separate actuator.

In at least one embodiment, the member 104 is electrically coupled to an actuator to move the member 104. The actuator can be the same actuator 128 electrically coupled to the printhead 108 and the applicator 116 or a separate actuator. Accordingly, in addition to moving the printhead 108, the applicator 116, the curing device 152, and the leveler 156 relative to the member 104, the member 104 can also be moved relative to the printhead 108 and the applicator 116 to enable more efficient and precise positioning of the member 104, the printhead 108, the applicator 116, the curing device 152, and the leveler 156 relative to one another.

As noted previously, one issue in three-dimensional object printing arises from the constraints on materials that can be ejected from ejectors of three-dimensional printers. In the device of FIG. 1, the second material 144 has a lower coefficient of friction and has a higher melting temperature than the first material 136. Accordingly, the applicator 116 is configured differently than the printhead 108. In particular, the ejectors of the plurality of applicator ejectors 120 on the applicator 116 are configured and arranged differently from the ejectors of the plurality of ejectors 112 on the printhead 108. More specifically, the melting temperature of the second material 144 is high enough that it is not practical for the applicator 116 to heat or maintain the second material 144 in a non-solid form. For this reason, the second material 144 is provided in the second material supply 140 as a powder, and the applicator 116 is configured to eject powdered second material 144 and air through the plurality of applicator ejectors 120 as an aerosol. Thus, each ejector of the plurality of applicator ejectors 120 has a larger diameter than each ejector of the plurality of ejectors 112, and the plurality of applicator ejectors 120 are spaced with a lower density on the applicator 116 than the plurality of ejectors 112 on the printhead 108. Because the plurality of applicator ejectors 120 are larger and spaced farther apart than the plurality of ejectors 112, ejection of the second material 144 is less precise than ejection of the first material 136.

Figure 2:
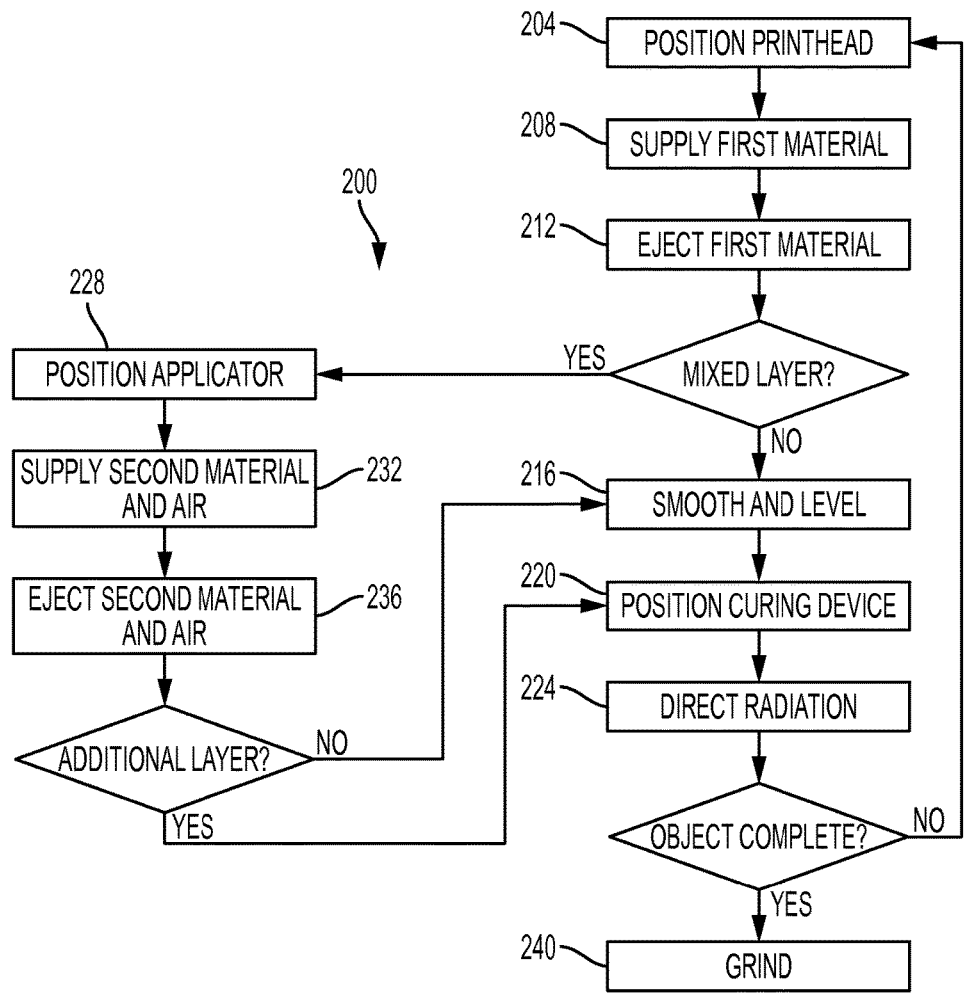
FIG. 2 depicts a method for forming an object with regions having different coefficients of friction.

A method 200 for operating a printing system to form the object 168 with regions 160, 164 having different coefficients of friction is shown in FIG. 2. In the description of the method, statements that the method is performing some task or function refers to a controller or general purpose processor executing programmed instructions stored in non-transitory computer readable storage media operatively connected to the controller or processor to manipulate data or to operate one or more components in the printer to perform the task or function. The controller 124 noted above can be such a controller or processor. Alternatively, the controller can be implemented with more than one processor and associated circuitry and components, each of which is configured to form one or more tasks or functions described herein. The programmed instructions include specifications and dimensions for portions of the object 168 to be made of the first material 136 having the first coefficient of friction and portions of the object 168 to include the second material 144 having the second coefficient of friction.

When the method 200 is performed, the printhead 108 is first positioned above the member 104 (block 204). This positioning is accomplished by the controller 124 operating the actuator 128 to move the printhead 108 relative to the member 104 or to move the member 104 relative to the printhead 108 or to move both the member 104 and the printhead 108. Once positioned above the member 104, the controller 124 operates the printhead 108 to eject the first material 136 toward the member 104 (block 212). In at least one embodiment, the controller 124 also operates the first material supply 132 to provide the first material 136 to the printhead 108 for ejection (block 208). As shown in FIG. 3A, the ejected first material 136 forms a region 160 on the member 104. The region 160 is an outermost uncured layer 172.

Next, if the programmed instructions indicate that the outermost uncured layer 172 is only to include the first material 136, in other words, the outermost uncured layer 172 is not a mixed layer including both the first material 136 and the second material 144, the controller 124 operates the leveler 156 to smooth and level the outermost uncured layer 172 (block 216). More precisely, the controller 124 operates the leveler 156 to contact and apply pressure to the outermost uncured layer 172 of the object 168 with the roll 180 to remove a topmost portion of the outermost uncured layer 172 (block 216). Next, the curing device 152 is positioned above the member 104 (block 220). This positioning is accomplished by the controller 124 operating the actuator 128 to move the printhead 108 and the curing device 152 relative to the member 104 or to move the member 104 relative to the printhead 108 and the curing device 152 or to move the printhead 108, the curing device 152, and the member 104 relative to one another. Once positioned above the member 104, the controller 124 operates the curing device 152 to direct radiation toward the member 104 (block 224). The first material 136 is cured by the radiation from the curing device 152 to transform the outermost uncured layer 172 into an outermost cured layer 176 (shown in FIG. 3B).

The method 200 can include repeating the positioning of the printhead 108 above the member 104 (block 204), supplying the first material 136 to the printhead 108, ejecting the first material 136 toward the member 104 to form an outermost uncured layer 172 (block 212), smoothing and leveling the outermost uncured layer 172 (block 216), positioning the curing device 152 above the member 104 (block 220), and directing radiation toward the member 104 to form an outermost cured layer 176 (block 224) to form multiple outermost cured layers 176 of the object 168 made solely of the first material 136. In other words, the method can include forming multiple layers of the object 168 made solely of the first material 136.

When the programmed instructions include forming a layer of the object 168 including both the first material 136 and the second material 144, or a mixed layer, the method 200 once again repeats positioning of the printhead 108 above the member 104 (block 204), supplying the first material 136 to the printhead 108 (block 208), and ejecting the first material 136 toward the member 104 to form an outermost uncured layer 172 (block 212), as shown in FIG. 3C. However, rather than the outermost uncured layer 172 being smoothed and leveled (block 216), the curing device 152 above the member (block 220), and radiation being directed toward the member 104 (block 224), the applicator 116 is then positioned above the member 104 (block 228). This positioning is accomplished by the controller 124 operating the actuator 128 to move the applicator 116 relative to the member 104 or to move the member 104 relative to the applicator 116 or to move the applicator 116 and the member 104 relative to one another.

Once positioned above the member 104, the controller 124 operates the applicator 116 to eject the second material 144 and air toward the member 104 (block 236). Thus, the aerosol made up of the second material 144 and air is directed toward the outermost uncured layer 172 of the object 168. In at least one embodiment, the controller 124 also operates the second material supply 140 and the air supply 148 to provide the second material 144 and air to the applicator 116 for ejection (block 232).

Figure 3D:
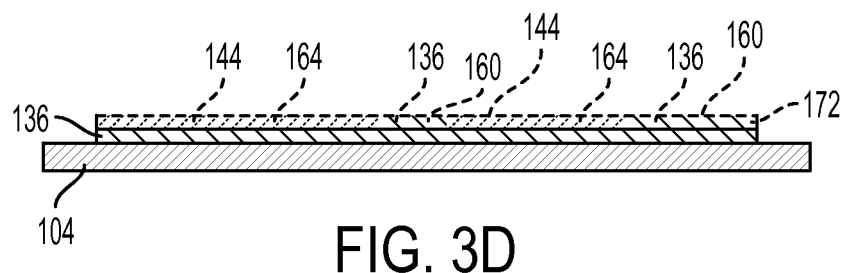
FIG. 3D shows a side cross-sectional view of the object of FIG. 1 after a fourth portion of the method of FIG. 2 has been completed.

Because the first material 136 of the outermost uncured layer 172 is not cured, the powdered second material 144 adheres to the first material 136 and forms a region 164 on the member 104, as shown in FIG. 3D. In other words, the outermost uncured layer 172 of the object 168 includes a region 160 of the first material 136 and a region 164 including the second material 144. As mentioned above, the controller 124 is configured to digitally address the plurality of applicator ejectors 120. Thus, as shown in FIG. 3D, the applicator 116 selectively ejects the aerosol over only a portion of the outermost uncured layer 172 that is to be formed as the region 164 including the second material 144. Accordingly, to form an entire outermost uncured layer 172 including the second material 144, the controller 124 operates the applicator 116 to eject the aerosol over the entire outermost uncured layer 172 of the object 168.

Figure 3E:
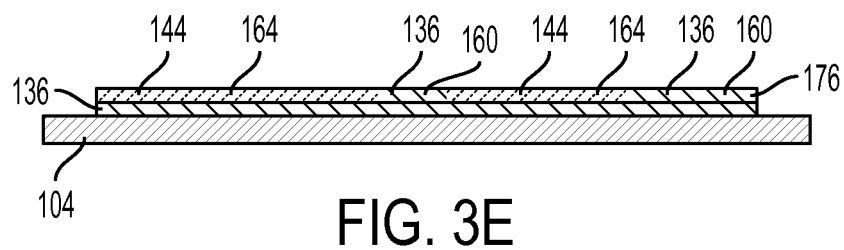
FIG. 3E shows a side cross-sectional view of the object of FIG. 1 after a fifth portion of the method of FIG. 2 has been completed.

Once the outermost uncured layer 172 of the object 168 having both a region 160 and a region 164 is formed, if the programmed instructions indicate that an additional layer of material is to be applied to the object 168, the curing device 152 is again positioned above the member 104 (block 220), and radiation is again directed toward the member 104 (block 224) to cure the outermost uncured layer 172 into an outermost cured layer 176, as shown in FIG. 3E. When the first material 136 of the region 164 including the second material 144 cures, it cures around the powder of the second material 144 that has adhered to the first material 136. Accordingly, the second material 144 is retained on the first outer material 136 and an outermost cured layer 176 is formed, which includes both the first material 136 and the second material 144. In other words, the region 164 includes both the first material 136 and the second material 144, and the second material 144 substantially covers the first material 136 in the outermost cured layer 176.

Figure 3F:
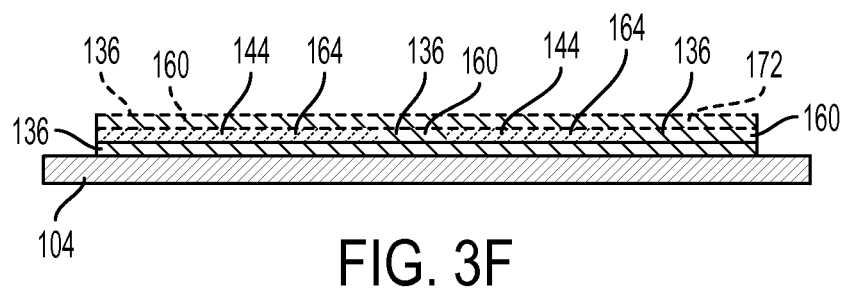
FIG. 3F shows a side cross-sectional view of the object of FIG. 1 after a sixth portion of the method of FIG. 2 has been completed.
Figure 3G:
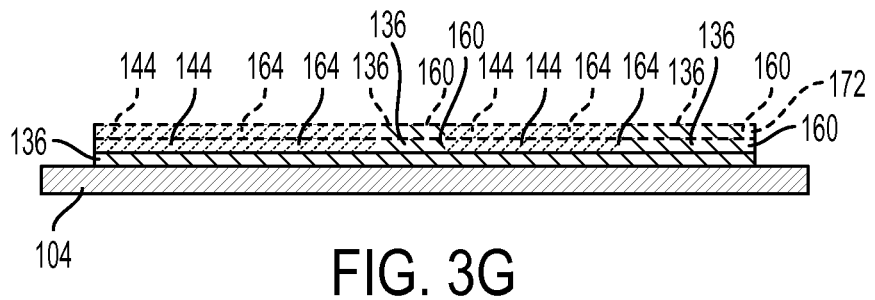
FIG. 3G shows a side cross-sectional view of the object of FIG. 1 after a seventh portion of the method of FIG. 2 has been completed.

As shown in FIG. 3F, the method 200 can include repeating the positioning of the printhead 108 above the member 104 (block 204), supplying the first material 136 to the printhead 108, and ejecting the first material 136 toward the member 104 to form another outermost uncured layer 172 (block 212). As shown in FIG. 3G, the method 200 can include repeating the positioning of the applicator 116 above the member 104 (block 228) and supplying the second material 144 and air to the applicator 116 (block 232), and ejecting the second material 144 and air toward the member 104 to adhere to the first material 136 in the outermost uncured layer 172 (block 236).

Figure 3H:
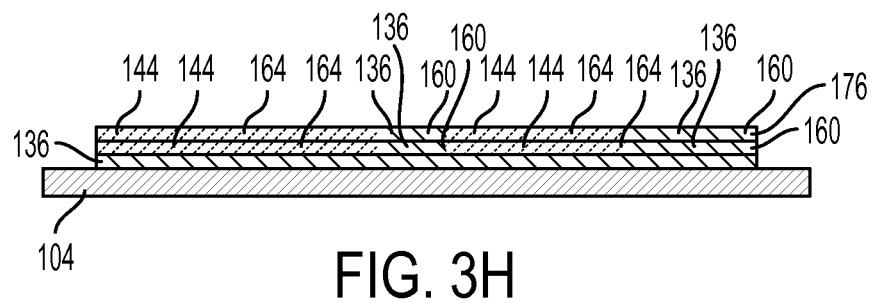
FIG. 3H shows a side cross-sectional view of the object of FIG. 1 after an eighth portion of the method of FIG. 2 has been completed.

When the programmed instructions indicate that no additional layers are to be applied to the object 168, the method includes smoothing and leveling (block 216) the outermost uncured layer 172, and, as shown in FIG. 3H, positioning the curing device 152 above the member 104 (block 220), and directing radiation toward the member 104 to form an outermost cured layer 176 (block 224). In other words, only the topmost layer of the object 168 which is a mixed layer, including both regions 160 and regions 164, is smoothed and leveled before curing. In at least one embodiment, when the programmed instructions indicate that the object 168 is complete, the method 200 also includes grinding the outermost cured layer 176 of the object 168 (block 240) to provide a smooth outermost surface and an accurate height of the object 168. The method 200 can be used to form multiple outermost cured layers 176 of the object 168 including regions 160 and regions 164. Accordingly, the controller 124 is configured to execute program instructions via the method 200 to form a multi-layer object 168 having any number of layers including only portions 160 made of the first material 136, any number of layers including only portions 164 including the second material 144, and any number of layers including both portions 160 made of the first material 136 and portions 164 including the second material 144. One advantage of an object 168 having multiple layers with portions 164, which include the second material 144, is that removal of an outermost cured layer 176 of the object 168 from wear over time exposes another outermost cured layer 176, which also includes a portion 164. This redundancy in layers containing the second material 144 enables the outermost cured layer 176 of the object 168 to continue to have the lower coefficient of friction of the second material 144.

Figure 4A:
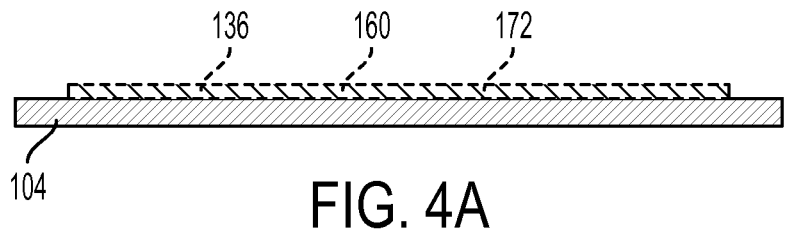
FIG. 4A shows a side cross-sectional view of the object of FIG. 1 after a first portion of the method of FIG. 2 has been completed.
Figure 4B:
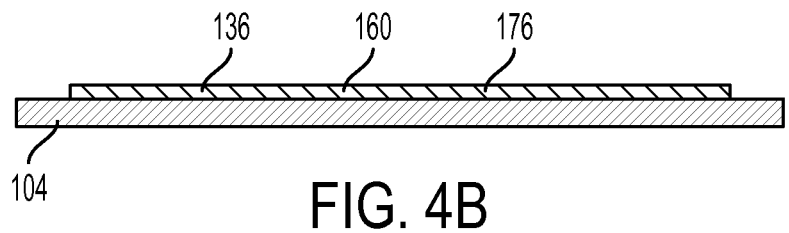
FIG. 4B shows a side cross-sectional view of the object of FIG. 1 after a second portion of the method of FIG. 2 has been completed.

In another embodiment, the method 200 can be carried out in such a manner as to form regions 164 including the second material 144 in the form of raised portions. Referring again to FIG. 2, first the printhead 108 is positioned above the member 104 (block 204), the first material 136 is supplied to the printhead 108 (block 208), and the first material 136 is ejected toward the member 104 (block 212). As shown in FIG. 4A, this operation forms an outermost uncured layer 172 comprising a region 160 of the first material 136. Next, as shown in FIG. 2, the outermost uncured layer 172 is smoothed and leveled (block 216), the curing device 152 is positioned above the member 104 (block 220) and radiation is directed toward the member 104 (block 224). As shown in FIG. 4B, this irradiation forms an outermost cured layer 176 comprising the region 160 of the first material 136.

Figure 4C:
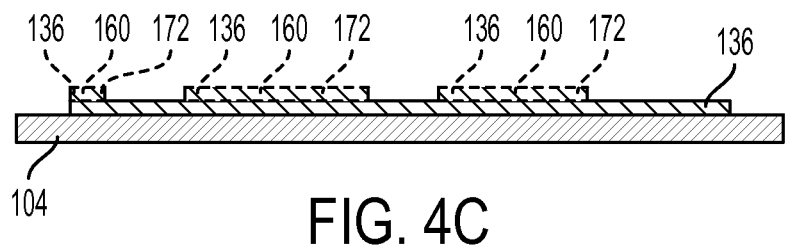
FIG. 4C shows a side cross-sectional view of the object of FIG. 1 after a third portion of the method of FIG. 2 has been completed.

Next, the printhead 108 is again positioned above the member 104 (block 204), first material 136 is again supplied to the printhead 108 (block 208), and the first material 136 is again ejected toward the member 104 (block 212). In this embodiment, however, the controller 124 digitally addresses the plurality of ejectors 112 on the printhead 108 to only selectively eject the first material 136 toward the member 104. As shown in FIG. 4C, this selective ejection forms an outermost uncured layer 172 including separate regions 160 of the first material 136. In at least one embodiment, the separate regions 160 of the first material 136 are separated by spacing material (not shown), in a manner known in the art.

Figure 4D:
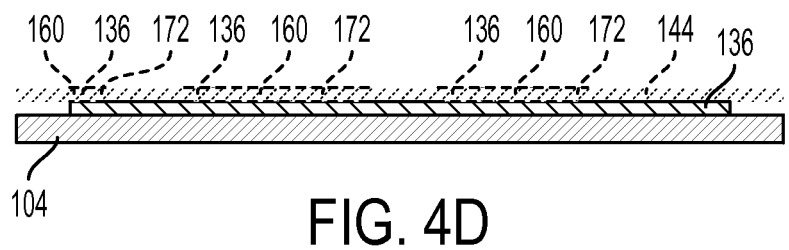
FIG. 4D shows a side cross-sectional view of the object of FIG. 1 after a fourth portion of the method of FIG. 2 has been completed.
Figure 4E:
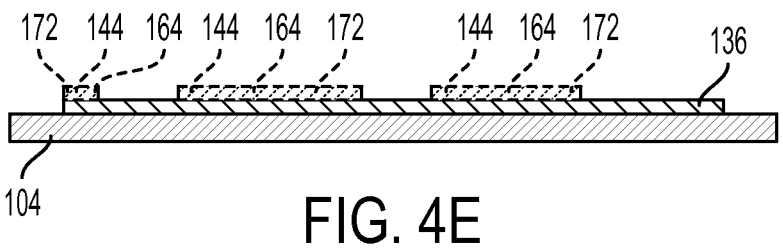
FIG. 4E shows a side cross-sectional view of the object of FIG. 1 after a fifth portion of the method of FIG. 2 has been completed.

As shown in FIG. 2, when the programmed instructions indicate that the outermost uncured layer 172 is to be a mixed layer, the method 200 continues with positioning the applicator 116 above the member 104 (block 228), supplying the second material 144 and air to the applicator 116 (block 232), and ejecting the second material 144 and air from the applicator 116 toward the member 104 (block 236). As mentioned above, the second material 144 adheres to uncured first material 136. Accordingly, as shown in FIG. 4D, the applicator 116 can apply the second material 144 and air over the entire member 104 and, as shown in FIG. 4E, the second material 144 only adheres to the separate regions 160 of the first material 136. One advantage of applying the second material 144 and air in this manner is that the applicator 116 is not required to have any precision, and the controller 124 is not required to digitally address the applicator 116. However, in an alternative embodiment, the controller 124 can digitally address the applicator 116 to eject the second material 144 and air only above the separate regions 160 of the first material 136. One advantage of applying the second material 144 and air in this manner is that less of the second material 144 is required and less of the second material 144 needs to be recollected or wasted.

Figure 4F:
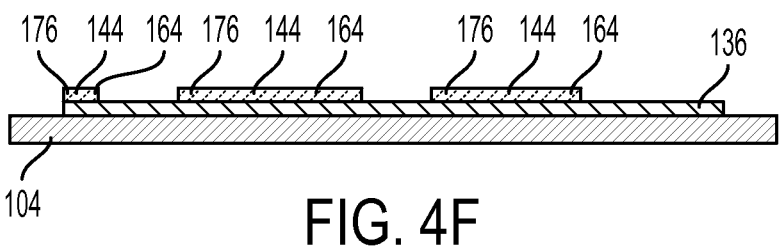
FIG. 4F shows a side cross-sectional view of the object of FIG. 1 after a sixth portion of the method of FIG. 2 has been completed.
Figure 4G:
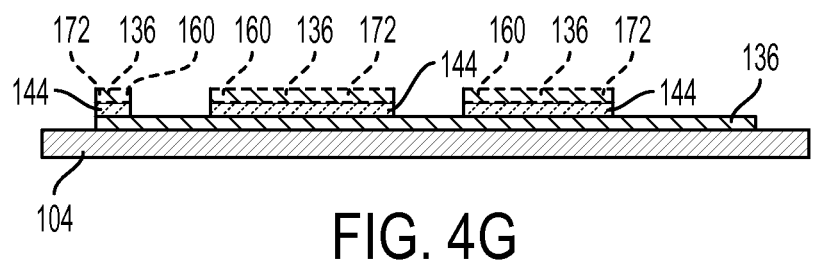
FIG. 4G shows a side cross-sectional view of the object of FIG. 1 after a seventh portion of the method of FIG. 2 has been completed.
Figure 4H:
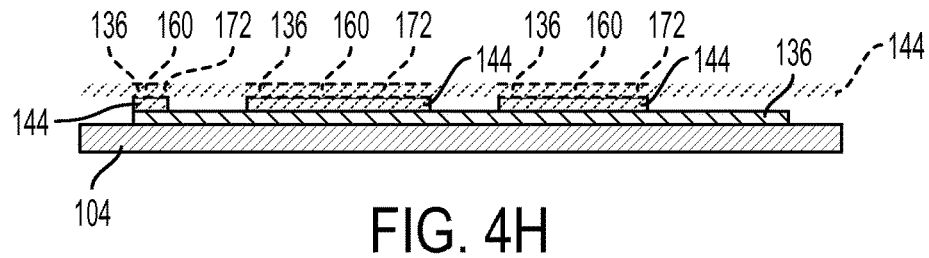
FIG. 4H shows a side cross-sectional view of the object of FIG. 1 after an eighth portion of the method of FIG. 2 has been completed.
Figure 4I:
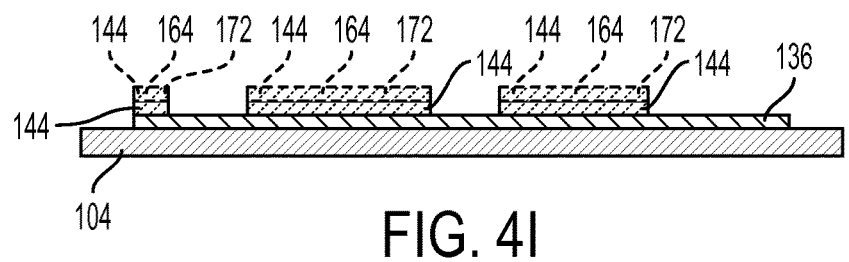
FIG. 4I shows a side cross-sectional view of the object of FIG. 1 after a ninth portion of the method of FIG. 2 has been completed.

Once the second material 144 has adhered to the first material 136 in the regions 160 of outermost uncured layer 172 to form regions 164, if the programmed instructions indicate that an additional layer is to be added to the object 168, the curing device 152 is positioned above the member (block 220) and radiation is directed toward the member 104 (block 224) to cure the first material 136 and form an outermost cured layer 176 including regions 164 including the second material 144 (as shown in FIG. 4F). As mentioned above, the method 200 can be repeated, as shown in FIGS. 4G, 4H, 4I, and 4J, to apply multiple layers of first material 136 and second material 144 to form the object 168. When the programmed instructions indicate that no additional layers are to be added to the object 168, the controller 124 operates the leveler 156 to smooth and level the outermost uncured layer 172 (block 216), the curing device 152 is positioned above the member (block 220), and radiation is directed toward the member 104 (block 224). In at least one embodiment, when the programmed instructions indicate that the object 168 is complete, the method 200 includes grinding the outermost cured layer 176 of the object 168 (block 240).

Figure 4J:
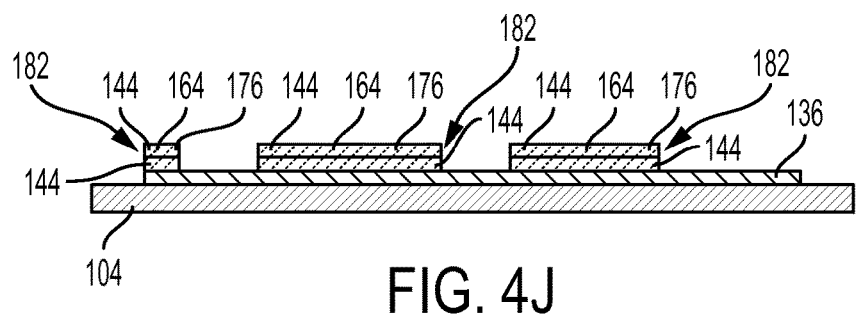
FIG. 4J shows a side cross-sectional view of the object of FIG. 1 after a tenth portion of the method of FIG. 2 has been completed.

As shown in FIG. 4J, when multiple layers of the first material 136 are applied, raised portions 182 are formed on the object 168. One advantage of forming the object in this manner is that the outermost cured layer 176 including regions 164 containing the second material 144 stands proud of layers consisting of regions 160 of the first material 136 only. Thus, the regions 164 having the lower coefficient of friction are exposed to make first contact with another surface or object in use.

Figure 5:
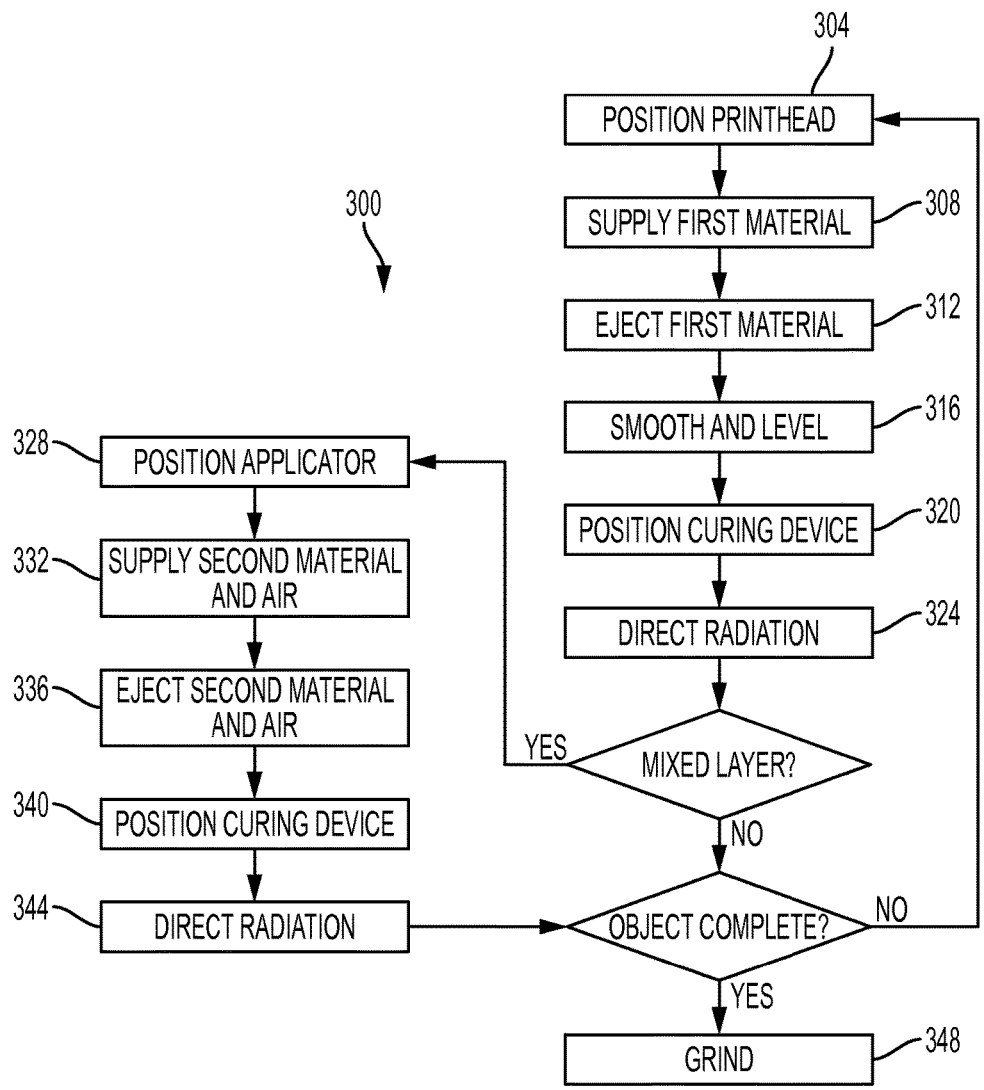
FIG. 5 depicts another method for forming an object with regions having different coefficients of friction.
Figure 6A:
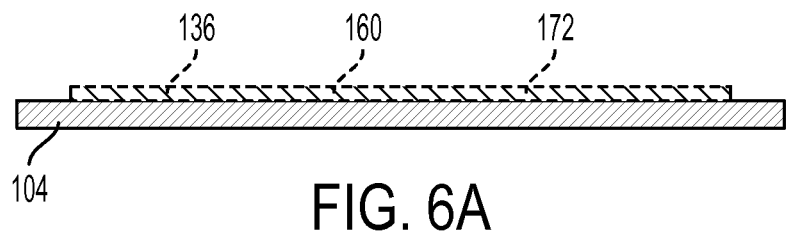
FIG. 6A shows a side cross-sectional view of the object of FIG. 1 after a first portion of the method of FIG. 5 has been completed.
Figure 6B:
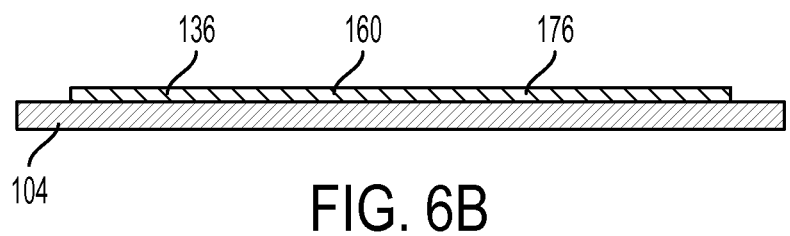
FIG. 6B shows a side cross-sectional view of the object of FIG. 1 after a second portion of the method of FIG. 5 has been completed.

In yet another embodiment, shown in FIG. 5, a method 300 can be carried out to form an object 168 having an outermost cured layer 176 formed of the first material 136 and the second material 144. The method 300 is similar to the method 200, shown in FIG. 2 and described above, except that the method 300 can be carried out in such a manner as to form regions 164 including the second material 144 within regions 160 formed of the first material 136 by selectively curing portions of an outermost uncured layer 172 of the first material 136. As shown in FIG. 5, first the printhead 108 is positioned above the member 104 (block 304), the first material 136 is supplied to the printhead 108 (block 308), and the first material 136 is ejected toward the member 104 (block 312). As shown in FIG. 6A, this operation forms an outermost uncured layer 172 comprising a region 160 of the first material 136. Next, as shown in FIG. 5, the outermost uncured layer 172 is smoothed and leveled (block 316), the curing device 152 is positioned above the member 104 (block 320) and radiation is directed toward the member 104 (block 324). As shown in FIG. 6B, this operation forms an outermost cured layer 176 comprising the region 160 of the first material 136.

Figure 6C:
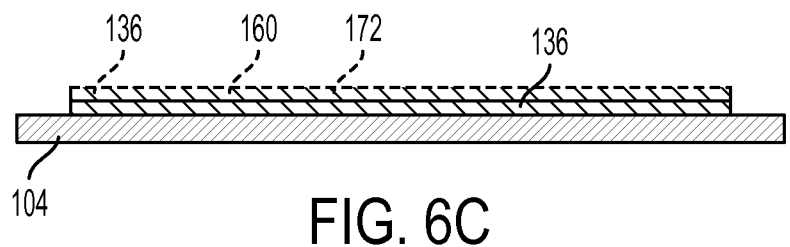
FIG. 6C shows a side cross-sectional view of the object of FIG. 1 after a third portion of the method of FIG. 5 has been completed.

Next, if the programmed instructions indicate that a mixed layer, including both the first material 136 and the second material 144 is to be added to the object 168, the printhead 108 is again positioned above the member 104 (block 304), first material 136 is again supplied to the printhead 108 (block 308), and the first material 136 is again ejected toward the member 104 (block 312). As shown in FIG. 6C, this operation forms a new outermost uncured layer 172 comprising a region 160 of the first material 136.

Figure 6D:
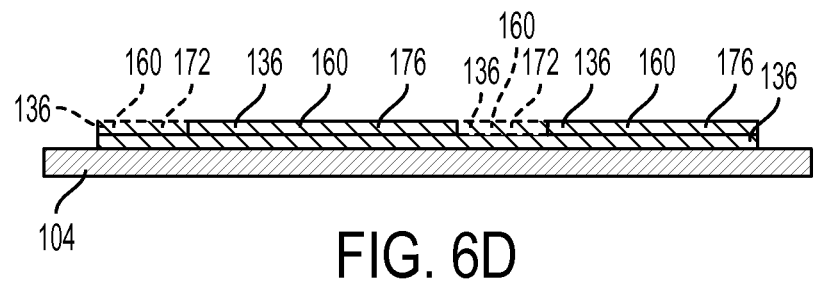
FIG. 6D shows a side cross-sectional view of the object of FIG. 1 after a fourth portion of the method of FIG. 5 has been completed.

The method 300 continues with smoothing and leveling the outermost uncured layer 172 (block 316), positioning the curing device 152 above the member 104 (block 320) and directing radiation towards the member 104 (block 324) to cure the first material 136. In method 300, however, the controller 124 operates the curing device 152 to only selectively direct radiation toward the member 104 to selectively cure regions 160 of the first material 136. As shown in FIG. 6D, this operation results in regions 160 of the first material 136 forming both an outermost uncured layer 172 and an outermost cured layer 176 in the same layer of the object 168.

Figure 6E:
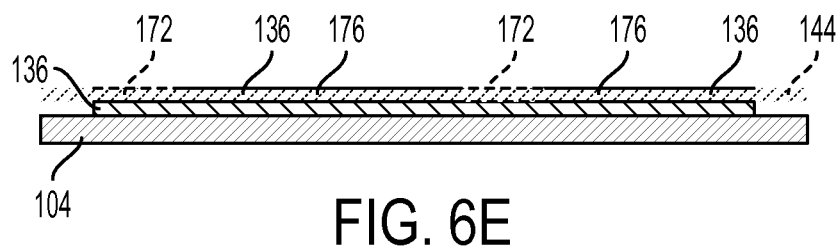
FIG. 6E shows a side cross-sectional view of the object of FIG. 1 after a fifth portion of the method of FIG. 5 has been completed.
Figure 6F:
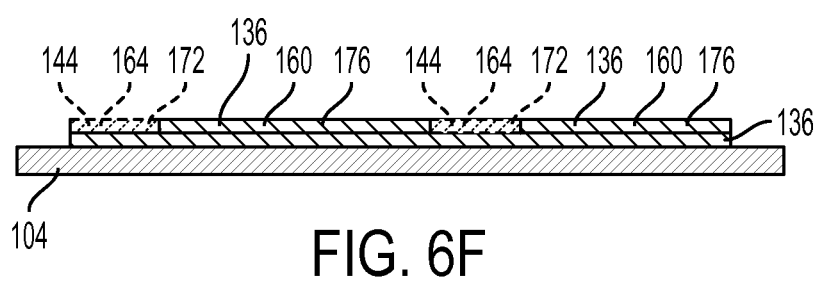
FIG. 6F shows a side cross-sectional view of the object of FIG. 1 after a sixth portion of the method of FIG. 5 has been completed.

The method 300 continues with positioning the applicator 116 above the member 104 (block 328), supplying the second material 144 and air to the applicator 116 (block 332), and ejecting the second material 144 and air from the applicator 116 toward the member 104 (block 336). As mentioned above, the second material 144 adheres to uncured first material 136. Accordingly, as shown in FIG. 6E, the applicator 116 can apply the second material 144 and air over the entire member 104 and, as shown in FIG. 6F, the second material 144 only adheres to the regions 160 of the first material 136 that are uncured. In an alternative embodiment, the controller 124 can digitally address the applicator 116 to eject the second material 144 and air only above the regions 160 of the first material 136 that are uncured.

Figure 6G:
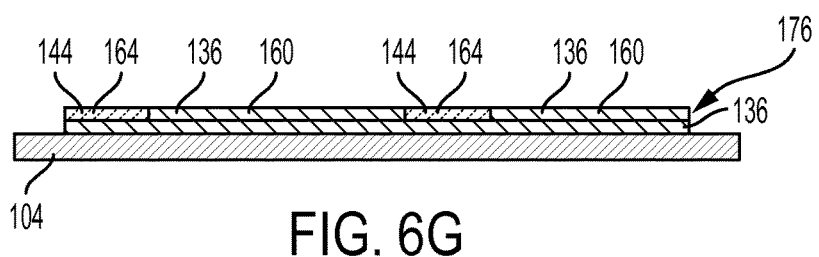
FIG. 6G shows a side cross-sectional view of the object of FIG. 1 after a seventh portion of the method of FIG. 5 has been completed.

Once the second material 144 has adhered to the regions 160 of the first material 136 that are uncured, the curing device 152 is again positioned above the member (block 340) and radiation is directed toward the member 104 (block 344) to cure the first material 136 and form regions 164 including the second material 144 (as shown in FIG. 6G). Thus, as shown in FIG. 6G, the outermost cured layer 176 of the object 168 includes both regions 160 of the first material 136 and regions 164 including the second material 144. As mentioned above, the method 300 can be repeated to apply multiple layers of first material 136 and second material 144 to form the object 168. In at least one embodiment, when the programmed instructions indicate that the object 168 is complete, the method 300 includes grinding the outermost cured layer 176 (block 348).

In at least one embodiment, the controller 124 is configured to adjust an amount of second material 144 ejected from the applicator 116. For example, the controller 124 can be configured to adjust a ratio of second material 144 to air that is ejected from the applicator 116. Adjusting the concentration of second material 144 enables selection of the coefficient of friction of regions 164 including the second material 144.

In at least one embodiment, the controller 124 is configured to digitally address the plurality of applicator ejectors 120 to eject the second material 144 and air toward the member 104 in a dithered pattern. "Dithered" means that the controller operates some of the applicator ejectors while not operating others to distribute the second material 144 in patterns that are less dense than solid coverage areas. For example, in a 3×3 pattern, the controller can operate the 4 ejectors that provide the second material at the corners of the area and the ejector that provides the second material at the center of the pattern. In this embodiment, the second material 144 does not completely cover uncured first material 136, because it does not blanket the first material 136. While this type of coverage provides small areas 164 of the first material 136 and the second material 144 interspersed within regions 160 comprising the first material 136 alone, it can provide enough coverage to lower the overall coefficient of friction for the area to a sufficient level for a particular application. Thus, dithering can conserve the second material and can enable more formation of areas with more precise coefficients of friction by controlling the amount and frequency of the regions 164 within an area of regions 160.

Alternatively, the controller 124 can be configured to digitally address the plurality of ejectors 112 to eject the first material 136 toward the member 104 in a dithered pattern. In this embodiment, because the second material 144 adheres to uncured first material 136, the second material 144 also forms a dithered pattern. Thus, applying the first material 136 in a dithered pattern can also enable selection of the coefficient of friction of the outermost cured layer 176 of the object 168 by controlling the amount and frequency of the regions 164 within an area of regions 160.

The printing system 100 and the method 200 can be employed to form an object 168 having any shape capable of being produced by a three-dimensional printer. The object 168 can be formed with any number of layers and having any pattern of regions 160 having a first coefficient of friction and regions 164 having a second coefficient of friction. As a consequence, the topology of the outer surface of the object 168 can be precisely varied and positioned.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A method of forming an object with regions having different coefficients of friction comprising:
   operating selectively with a controller a plurality of ejectors operatively connected to a supply of a first material to form a layer of an object on a member;
   operating with the controller a curing device to cure a portion of the first material of the layer of the object to produce a first region of the cured first material and a second region of uncured first material of the layer of the object;
   operating with the controller an actuator to move an applicator that is fluidly connected to a supply of polytetrafluoroethylene (PTFE) and to a supply of air to a position that enables the applicator to apply the PTFE to the first region of the cured first material and to the second region of the uncured first material of the layer of the object; and
   adjusting operation of the applicator with the controller to mix the PTFE together with air from the air supply at a predetermined ratio and then eject the mixture of the PTFE and the air toward the member to apply the mixture of the PTFE and air to the first region of the cured first material and to apply the mixture of the PTFE and the air to the second region of uncured first material to produce a first coefficient of friction at the first region of the cured first material of the layer of the object and to produce a second coefficient of friction at the second region of uncured first material of the layer of the object.

2. The method of claim 1, the operation of the applicator further comprising:
   operating selectively with the controller a plurality of ejectors in the applicator that are fluidly connected to the supply of PTFE and to the supply of air to eject the PTFE to be applied to the second region of the uncured first material for the object with a digital pattern.

3. The method of claim 1 further comprising:
   operating the curing device with the controller to direct radiation towards the second region of the uncured first material after the PTFE has been applied.

4. The method of claim 1 further comprising:
   operating a leveler with the controller to remove the first material having the PTFE from the layer of the object.

5. The method of claim 2 further comprising:
   operating with the controller the plurality of ejectors fluidly connected to the supply of PTFE and the supply of air to apply the mixture of the PTFE and air to the second region in a dithered pattern.

6. The method of claim 2 further comprising:
iteratively operating with the controller the plurality of ejectors fluidly connected to the supply of the first material, the curing device, and the plurality of ejectors fluidly connected to the supply of the PTFE and to the supply of air to form the second region of the uncured first material with a predetermined thickness of the first material.

7. The method of claim 1 further comprising:
adjusting an amount of the PTFE and an amount of air supplied to the applicator to enable selection of a predetermined second coefficient of friction for the second region of the uncured first material.

\* \* \* \* \*